(12) United States Patent
Wolde et al.

(10) Patent No.: US 7,590,753 B2
(45) Date of Patent: Sep. 15, 2009

(54) METHOD FOR OPERATING A PACKET BASED DATA NETWORK

(75) Inventors: Jürgen Wolde, Schulzendorf (DE); Emmanuel Dotaro, Verrieres le Buisson (FR); Laurent Ciavaglia, Fontainebleau (FR)

(73) Assignee: Alcatel, Paris (FR)

( * ) Notice: Subject to any disclaimer, the term of this patent is extended or adjusted under 35 U.S.C. 154(b) by 514 days.

(21) Appl. No.: 11/405,636

(22) Filed: Apr. 18, 2006

(65) Prior Publication Data

US 2006/0235996 A1    Oct. 19, 2006

(30) Foreign Application Priority Data

Apr. 19, 2005    (EP) .................................. 05290863

(51) Int. Cl.
G06F 15/16    (2006.01)
G06F 15/173    (2006.01)
G01R 31/08    (2006.01)

(52) U.S. Cl. ........................ 709/235; 709/230; 709/238; 370/229; 370/230; 370/230.1

(58) Field of Classification Search .................. 709/232, 709/253, 235, 230, 238; 370/230.1, 468, 370/229, 230
See application file for complete search history.

(56) References Cited

U.S. PATENT DOCUMENTS

| | | | |
|---|---|---|---|
| 6,339,803 B1 * | 1/2002 | Glassen et al. ................. | 710/52 |
| 6,614,805 B1 * | 9/2003 | Raahemi et al. .............. | 370/468 |
| 6,658,007 B1 * | 12/2003 | Pasternak et al. ......... | 370/395.4 |
| 6,748,435 B1 * | 6/2004 | Wang et al. .................. | 709/225 |
| 6,816,494 B1 | 11/2004 | Raza | |
| 7,158,528 B2 * | 1/2007 | Dell et al. ..................... | 370/416 |
| 7,161,904 B2 * | 1/2007 | Hussain et al. .............. | 370/230 |
| 7,349,342 B2 * | 3/2008 | Carpenter et al. ......... | 370/235.1 |
| 7,417,993 B1 * | 8/2008 | Ebergen et al. ......... | 370/395.72 |

(Continued)

FOREIGN PATENT DOCUMENTS

EP    1401156 A2    3/2004

OTHER PUBLICATIONS

Nizar Bouabdallah: "Matching Fairness and Performance by Preventive Traffic Control in Optical Multiple Access Networks," Marcoussis, France.

(Continued)

*Primary Examiner*—Moustafa M Meky
*Assistant Examiner*—Sargon N Nano
(74) *Attorney, Agent, or Firm*—Patti, Hewitt & Arezina, LLC

(57) ABSTRACT

A method for operating a packet based data network (21; 31), the data network (21; 31) comprising a multitude of nodes (A, B, C, D) and a shared data bus (22; 32), wherein at least some of the nodes (A, B, C, D) add traffic to the data bus (22; 32), and wherein the upstream nodes (A, B, C, D) reserve data transfer capacity of the data bus (22; 32) for downstream nodes (A, B, C, D) by means of a fairness mechanism, is characterized in that at least some of the nodes (A, B, C, D) drop traffic from the data bus (22; 32), and that said fairness mechanism takes into account the drop traffic at downstream nodes (A, B, C, D). The inventive method allows a better bandwidth utilization and uses available resources more efficiently.

10 Claims, 5 Drawing Sheets

U.S. PATENT DOCUMENTS

| | | | | |
|---|---|---|---|---|
| 7,467,223 | B2 * | 12/2008 | Wu et al. | 709/238 |
| 2002/0073226 | A1 * | 6/2002 | Sridhar et al. | 709/235 |
| 2003/0163593 | A1 * | 8/2003 | Knightly | 709/251 |
| 2003/0185229 | A1 * | 10/2003 | Shachar et al. | 370/460 |
| 2004/0177087 | A1 * | 9/2004 | Wu et al. | 707/102 |
| 2004/0184404 | A1 * | 9/2004 | Carpenter et al. | 370/235 |
| 2005/0080918 | A1 * | 4/2005 | Wu et al. | 709/233 |
| 2007/0104103 | A1 * | 5/2007 | Howe et al. | 370/230.1 |

OTHER PUBLICATIONS

Cyril Maillet: "Alcatel Research and Innovation Department—Multipoint Transport Networks (MTN) Performance Evaluation," 2004.

N. Le Sauze et al. "DBORN: a Shared WDM Ethernet bus architecture for optical packet metropolitan networks,".

N. Le Sauze et al: "DBORN: a Shared WDM Ethernet bus architecture for optical packet metropolitan networks," PS 2002, Cheju Island, Korea.

N. Le Sauze et al: "A novel, low cost optical packet metropolitan ring architecture.".

N. Bouabdallah et al. "Resolving the Fairness Issue in Bus-Based Optical Access Networks", IEEE, 2004, pp. S12-S18.

* cited by examiner state of the art

METHOD FOR OPERATING A PACKET BASED DATA NETWORK

The invention is based on a priority application EP 605290863.9 which is hereby incorporated by reference.

FIELD OF THE INVENTION

The invention relates to a method for operating a packet based data network, the data network comprising a multitude of nodes and a shared data bus, wherein at least some of the nodes add traffic to the data bus, and wherein with respect to a data flow in one direction of the data bus, the upstream nodes reserve data transfer capacity of the data bus for downstream nodes by means of a fairness mechanism.

BACKGROUND OF THE INVENTION

Such a method is described in L. Ciavaglia, N. Bouadallah, E. Dotaro and N. Le Sauze, "Matching Fairness and Performance by Preventive Traffic Control in Multiple Access Networks", Opticom, Dallas, Tex., USA, October 2003.

A data network is used for transferring data from one place to another. For this purpose, the network comprises nodes, i.e. devices for receiving data from and/or for feeding data into the network, and data transfer lines connecting the nodes. The data transfer lines are called buses.

A data bus has a direction towards which the signals carrying the data move on the bus. The nodes are situated along the bus. A node may receive data originating from nodes located upstream, i.e. located in the direction where signals come from, and a node may send data to nodes located downstream, i.e. located in the direction towards which signals move on the bus.

A bus has a limited data transfer capacity, caused e.g. by the limited bandwidth of a channel. Therefore, when data is to be added to the bus at a node, the node needs free data transfer capacity on the bus to do so. Without any measures, nodes located at or near the upstream end of the bus have a relatively easy access to the bus, whereas nodes located at or near the downstream end of the bus may have difficulties to find data transfer capacity not already used by upstream nodes.

For this reason, a fairness mechanism may be applied. The fairness mechanism makes upstream nodes (i.e. nodes with respect to which further nodes located downstream exist) reserve data capacity for downstream nodes (i.e. nodes with respect to which further nodes located upstream exist). Then downstream nodes will find free data transfer capacity on the bus.

L. Ciavaglia et al. describe an access control mechanism for a multipoint-to point network, comprising a plurality of nodes only adding data to a bus, and a single node only dropping data from the bus. It uses a preventive anti-token mechanism to grant access to the bus. An anti-token forbids a node to emit data traffic for a given amount of time, thus preserving voids for downstream nodes. For every node, a fixed amount of data transfer capacity is reserved, according to a Service Level Agreement (SLA). So every node will find some free data transfer capacity of the bus. A node may also benefit from unused reserved data transfer capacity of upstream nodes.

The disadvantage of this known method is a large amount of unused data transfer capacity (i.e. bandwidth) on the bus, in particular near the upstream end of the bus. Only at the downstream end of the bus, its full data transfer capacity may be used.

It is therefore the object of the invention to improve said method to allow a better bandwidth utilization, and to use available resources more efficiently.

SUMMARY OF THE INVENTION

This object is achieved, according to the invention, by a method as mentioned in the beginning, characterized in that at least some of the nodes drop traffic from the data bus, that said fairness mechanism takes into account the drop traffic at downstream nodes, and that the fairness mechanism applies anti-tokens at the nodes which add traffic to the bus, wherein the anti-tokens forbid a node to emit data traffic for a given amount of time, thus preserving voids for nodes located downstream.

In a multipoint-to-multipoint network, at least some of the intermediate nodes have a drop function, too. Data traffic dropped at an intermediate node principally causes a regain of available data transfer capacity downstream of said intermediate node. Therefore, the regained data transfer capacity can be used, in particular for adding data to the bus at the intermediate node or downstream nodes and/or for reserving data transfer capacity for downstream nodes that does not need to be reserved before the intermediate node. Since the fairness mechanism distributes the data transfer capacity to the nodes, an increase of the utilization of the data transfer capacity of the bus can be achieved by taking into account the drop traffic when allocating data transfer capacity to the nodes.

According to the invention, the fairness mechanism (or fairness algorithm, or traffic control mechanism, or bandwidth allocation mechanism) is realized with anti-tokens. The function of anti-tokens, as they are used with this invention, is described in EP 1 401 156 A2, the content of which is herewith incorporated by reference. The anti-token mechanism implies duties to nodes not to emit traffic (in contrast to a rate limiter mechanism which grants rights to emit traffic).

In more detail, the upstream nodes regulate their traffic emission based on the evaluation of the bandwidth demands of downstream nodes. The regulation of the traffic emission of upstream nodes consists in preserving free bandwidth for downstream nodes, in the proportion of their traffic demands, by forbidding the emission in upstream nodes. The regulation of the traffic emission in upstream nodes is based on a preventive traffic control process which uses "anti-tokens" to allocate free bandwidth for downstream nodes in priority to the traffic emission of upstream nodes. The anti-token generation is calculated in each upstream node by the bandwidth allocation controller of the node for each segment of the shared data bus, taking into account the traffic added to, and the traffic dropped from the shared data bus by the downstream nodes. In particular, token buckets can be used to achieve fair transmission rates for the nodes.

In a preferred variant of the inventive method, $R_i = A_{i+1} - D_{i+1} + R_{i+1}$ for at least some of the nodes, with i: node index number, wherein the index numbers increase in downstream direction of the data traffic; $R_i$: reserved data capacity at node i for downstream nodes; $A_{i+1}$: added traffic at node i+1, wherein node i+1 is the neighbouring node of node i on the data bus in downstream direction; $D_{i+1}$: dropped traffic at node i+1; $R_{1+1}$: reserved data capacity at node i+1. Preferably, the above formula applies to all nodes i=[1, . . . , N], with N: number of nodes on the bus; if applicable provided that for the node N at the downstream end of the bus $A_N=0$ and $R_N=0$, and for the second to last node N−1 at the downstream end of the bus $R_{N-1}=0$. With this variant, the bandwidth reserved for downstream nodes is minimized in upstream areas of the bus.

The amount of reserved data transfer capacity is adapted flexibly to the actual data traffic.

Another variant of the inventive method is characterized by a terminal node at the downstream end of the data bus, wherein data traffic is only dropped at the terminal node, and no data traffic is added at the terminal node. All traffic not dropped at intermediate notes is dropped at the terminal node. This variant keeps the network design simple. In an inventive alternative to this variant, the data bus is a ring bus with no defined end or beginning.

In an advantageous variant of the inventive method, in each node on the data bus, an opto-electronic conversion of all data traffic is done. By this means it is particularly simple to drop data out of the data bus electronically, but transfer data via the bus optically.

A highly preferred variant of the inventive method is characterized in that in at least some of the nodes, traffic from the data bus, i.e. transit traffic, and add traffic of the node can be processed, wherein the transit traffic and/or the add traffic comprise at least two priority levels, in particular priority and best effort, and that the fairness mechanism takes into account the origin of the traffic, i.e. transit or add traffic, as well as the priority level of the traffic. This allows a more purposeful use of the data bus. In particular, it is possible to reserve data transfer capacity only for add premium traffic of downstream nodes, what keeps a larger amount of data transfer capacity commonly available.

In a further development of the above variant, the node has a priority order of

I) transit premium traffic

II) reserved data capacity for downstream nodes

III) add premium traffic

IV) transit best effort traffic

V) add best effort traffic, or a priority order of

I) transit traffic

II) reserved data capacity for downstream nodes

III) add premium traffic

IV) add best effort traffic, wherein I) indicates highest priority. With these priority orders, good flow of data has been found in simulation experiments.

A particularly advantageous variant of the inventive method is characterized in that the add traffic at a node is split into logical paths according to the destination of the add traffic, and that a fairness mechanism is applied to each logical path to determine the data transfer capacity available for the respective logical path. This variant allows the direct control of data transfer between every pair of two nodes. This allows an even more efficient use of the data transfer capacity of the bus.

In a preferred further development of said variant, add traffic of a logical path of a first node with a destination not farther than a second node located anywhere downstream of the first node is added to the data bus independently from both the add traffic at the second node and the data capacity to be reserved downstream of the second node. Note that said first and second node may, but do not need to be neighbouring nodes on the bus. With this further development, a free data transfer capacity on the bus only available between the first and second node can be used for traffic added at the first node with a destination not farther than the second node. This allows the use of reserved bandwidth at upstream nodes as long as the reserved bandwidth is not yet needed. This makes the use of the data transfer capacity more efficiently.

Within the scope of the invention is also a node for adding traffic to a shared data bus of a packet based data network, characterized by means for splitting add traffic into logical paths according to the destination of the add traffic, and means for applying a fairness mechanism to each logical path to determine a data transfer capacity available for the respective path, wherein the fairness mechanism applies anti-tokens at the node, and wherein the anti-tokens forbid the node to emit data traffic for a given amount of time. Such a node can be used in carrying out the above mentioned variant of the inventive method. The node provides means for controlling access to the data transfer capacity, i.e. the resources, on a shared bus.

Further in the scope of the invention is a data network management system for performing all the steps of the inventive method as described above. The network management system determines anti-tokens at the nodes which add traffic to the bus.

Further advantages can be extracted from the description and the enclosed drawing. The features mentioned above and below can be used in accordance with the invention either individually or collectively in any combination. The embodiments mentioned are not to be understood as exhaustive enumeration but rather have exemplary character for the description of the invention.

DETAILED DESCRIPTION OF THE INVENTION

The invention relates to an improved fairness mechanism for access control to multipoint-to-multipoint networks.

Figure 1:
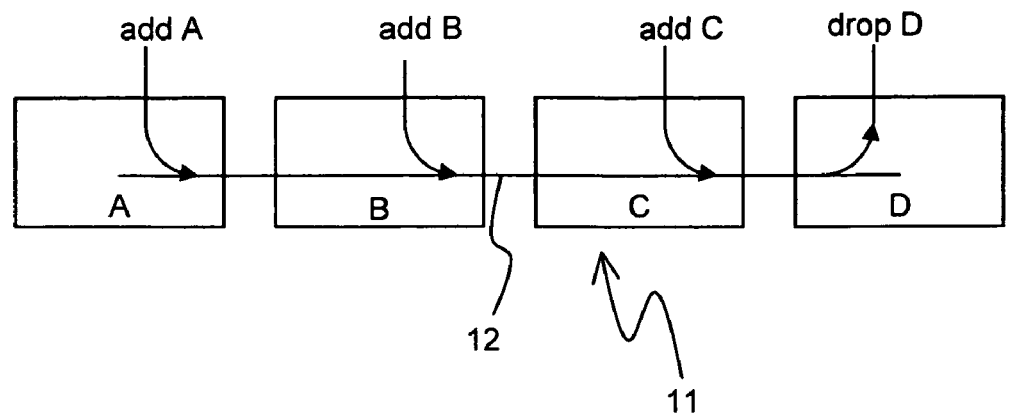
FIG. 1 shows a multipoint-to-point network architecture of the state of the art.

Fairness mechanisms are known from the state of the art for a multipoint-to-point network. Such a network is shown in FIG. 1. The multipoint-to-point network 11 comprises four nodes A, B, C, D, and a shared data bus 12. The overall data flow is directed towards note D at the end of the data bus 12. At nodes A, B, C, data is fed into the bus 12, as marked with add A, add B, add C. At the end node D, all data is dropped out of the network 11.

The data bus 12 has only a limited data transfer capacity. In order to guarantee that the intermediate notes B, C have the possibility to add a minimum amount of data to the bus 12, part of the data transfer capacity of the data bus 12 is reserved for the nodes B, C. This is done by means of a so called traffic control architecture using remote descriptors (TCARD) which uses a preventive mechanism to grant access to the resources, i.e. is free data transfer capacity. Anti-tokens forbid a node to emit traffic for a given amount of time, thus preserving voids for downstream nodes. In more detail, assuming that nodes A, B, C are supposed to add equal amounts of traffic to the data bus 12, node A may only use one third of the data transfer capacity of the data bus 12. Node B may also use one third of the data transfer capacity of the data bus 12, and, if present, may also use data transfer capacity of node A that has not been used. Likewise, node C can access at least one third of the data transfer capacity of the data bus 12, and may use, if available, unused data transfer capacity of nodes A, B.

As a result, between nodes A and B the data bus 12 is used to a maximum degree of one third of its data transfer capacity, and between nodes B and C a maximum of two thirds is used.

Figure 2:
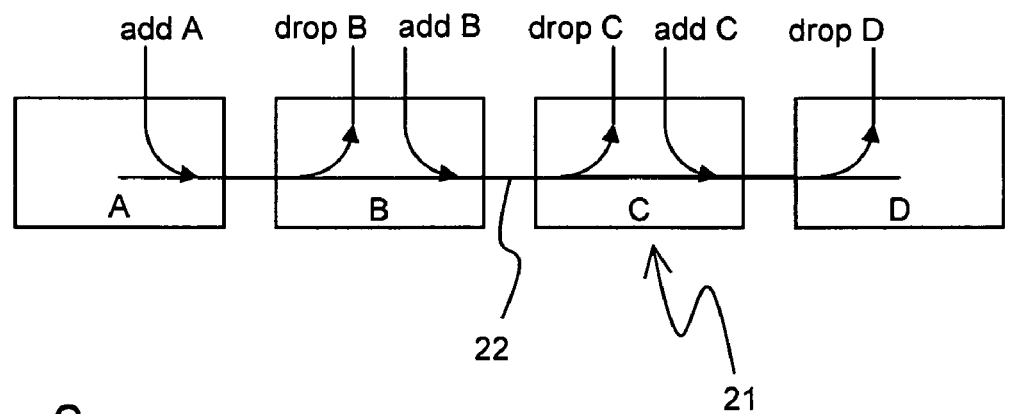
FIG. 2 shows a multipoint-to-multipoint network architecture for use with the inventive method.

The invention provides a fairness mechanism especially dedicated to multipoint to multipoint networks. Such a network to be used with the invention is shown FIG. 2. FIG. 2 shows a network 21 comprising four nodes A, B, C, D, and a data bus 22. In the example shown, the data bus 22 comprises optical data transfer lines, and at each node all data is subjected to a complete opto-electric conversion.

The overall data flow on the data bus 22 is again from left to right, i.e. is from node A towards node D. The first node A as well as the intermediate nodes B, C may feed data into the data bus 22, as marked with add A, add B, add C. The intermediate nodes B, C and the node D at the downstream end of the data bus may drop traffic from the data bus 22. After a dropping of data, dropped data is no more transported on the data bus 22.

In the data network 21, the fairness mechanism, which is based on anti-tokens, is provided to guarantee that the intermediate nodes B, C may add traffic to the data bus 22. I.e. the fairness mechanism has to guarantee that nodes B, C also have a minimum data transfer capacity on the data bus 22 available. As the core of the invention, that fairness mechanism takes into account drop traffic at the intermediate nodes B, C when allocating data transfer capacity to the adding nodes A, B, C. Due to the drop function of the intermediate nodes B, C, the remaining (i.e. unused) data transfer capacity (i.e. bandwidth in an optical system) will be increased by the amount of the bandwidth formerly used by drop traffic. In the example above, node C can insert traffic corresponding to the preserved bandwidth rate for that node, it can further use remaining bandwidth originally preserved for previous nodes, and it can use the bandwidth of traffic dropped at node C. Therefore, the calculation of TCARD parameters has to consider the amount of drop traffic to increase the total bandwidth utilization.

The drop C traffic bandwidth rate can either be used as spare bandwidth in node C to add traffic which exceeds the reserved add C rate, or the anti-token rate of node C can be reduced by the amount of drop C traffic. The latter preserves larger bandwidth capacity in other followed nodes (not shown).

The inventive fairness mechanism for a multipoint-to-multipoint network can be extended to logical paths between the nodes. Each logical path is characterized by parameters like bandwidth or service level given by service level agreements (SLA). More important, the logical paths are further characterized by a node of origin and a node of destination for the data transported on that logical path. The fairness mechanism can now be extended to consider all logical paths and their destinations instead of one unique add traffic path per node without considering the destination. That means, the fairness mechanism will be applied to various logical paths in each node. Then the fairness mechanism provides a traffic engineering tool that can organize the amount of traffic between the nodes including separating destinations as well as service levels to calculate fairness parameters, i.e. anti-tokens for each logical path. This fairness mechanism allows the use of bandwidth which is unused in previous methods.

For example, using FIG. 2, with the proposed extension data traffic can be inserted into the reserved bandwidth for node C by note A or node B if the destination of the traffic is known at the add port, and the destination is node C or an upstream node of node C. So, node A can insert traffic to node B and/or node C, and node B can insert traffic to node C. Because this traffic will be dropped in the node C, there will be no collision with the preserved bandwidth for node C.

As an additional effort, it is necessary to separate the traffic per destination at each add port. Furthermore, the TCARD mechanism has to handle more effective add ports. So the TCARD mechanism is used applying its rules to multiple logical paths with destination separation . As a result, a very effective bandwidth utilization can be achieved.

Figure 3:
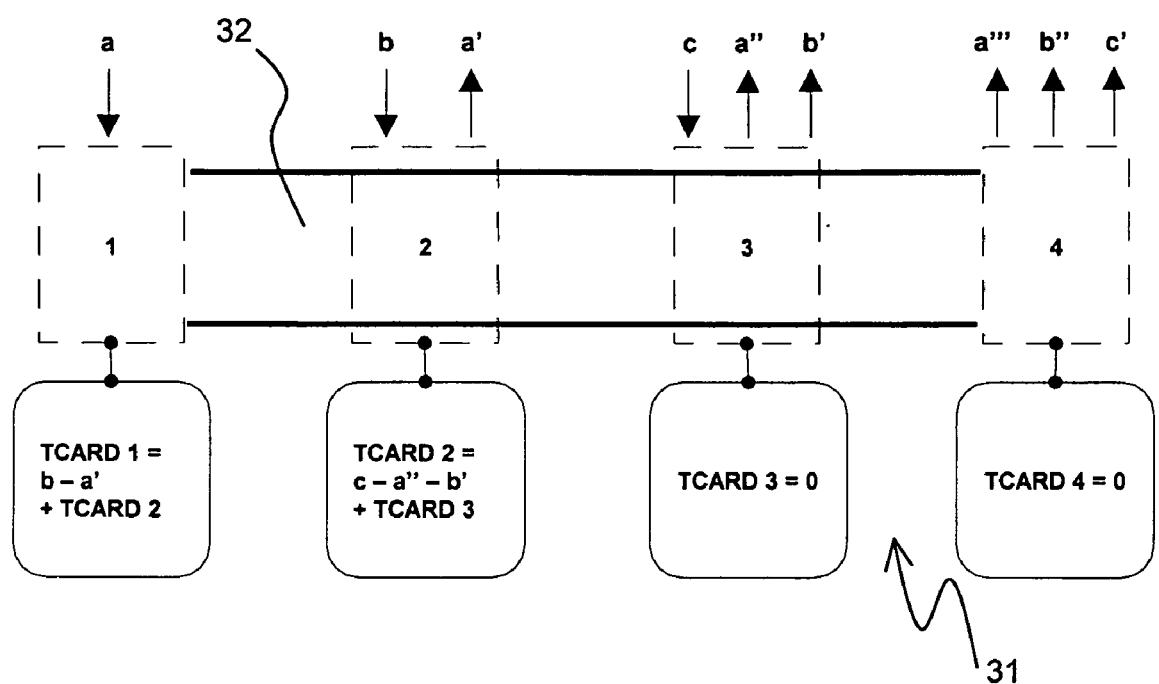
FIG. 3 shows a multipoint-to-multipoint network with a TCARD distribution in accordance with the invention.

FIG. 3 shows a multipoint-to-multipoint network with a TCARD distribution in accordance with the invention. The data network 31 comprises a first node A, a second node B, a third node C, and a fourth node D. It further comprises a data bus 32 with a data flow direction from left to right, that is from node A towards node D. At node A, traffic a is inserted into the data bus 32. Moreover, by means of a TCARD 1, bandwidth is reserved in the data bus 32. At node B, traffic b is added and traffic a' is dropped from the data bus 32. At node B, a TCARD 2 is applied in order to reserve bandwidth for the following node C. At node C, traffic c is added whereas traffic a" from node A and traffic b' from node B are dropped from the data bus 32. At node C, again a TCARD 3 is applied. However, since at node D no traffic is added, but only traffic is dropped, the TCARD 3 preserves a zero bandwidth. At node D, traffic a'" originating from node A is dropped, further traffic b" originating from node B is dropped, and traffic c' originating from node C is dropped. Node D also has formally a TCARD 4, but since no further nodes follow on the bus 32, the TCARD 4 reserves the bandwidth of zero.

At nodes A, B the TCARDS reserve bandwidth of the data bus 32 for following nodes, that is downstream nodes. Let us now consider TCARD 2:

TCARD 2 is to reserve bandwidth for the add traffic c at node C. Therefore, one of the summands of TCARD 2 is c. Further, at the second node B bandwidth is to be reserved for the following nodes, that is nodes C and D. Therefore another summand is TCARD 3 (however, in this case, TCARD 3 is zero). At node C traffic a" and b' is dropped from the data bus 32. This causes available data transfer capacity, that is bandwidth, at the data bus 32. So a" and b' reduce the bandwidth that needs to be reserved at TCARD 2. Therefore, a" and b' are subtracted from TCARD 2. If said subtractions cause TCARD 2 to become less than zero, then TCARD 2 is set to zero.

Likewise, the TCARD 1 at node A can be understood. TCARD 1 has to reserve bandwidth for add traffic b at node B, as well as further traffic to be added at downstream nodes of node B, that is a bandwidth corresponding to TCARD 2. However, at node B, traffic a' originating from node A, will be dropped, reducing the amount of reserved bandwidth needed downstream of node B. Therefore, the drop traffic a' can be subtracted from TCARD 1. Again, if the subtraction causes TCARD 1 to become less than zero, then TCARD 1 is set to zero.

Figure 4:
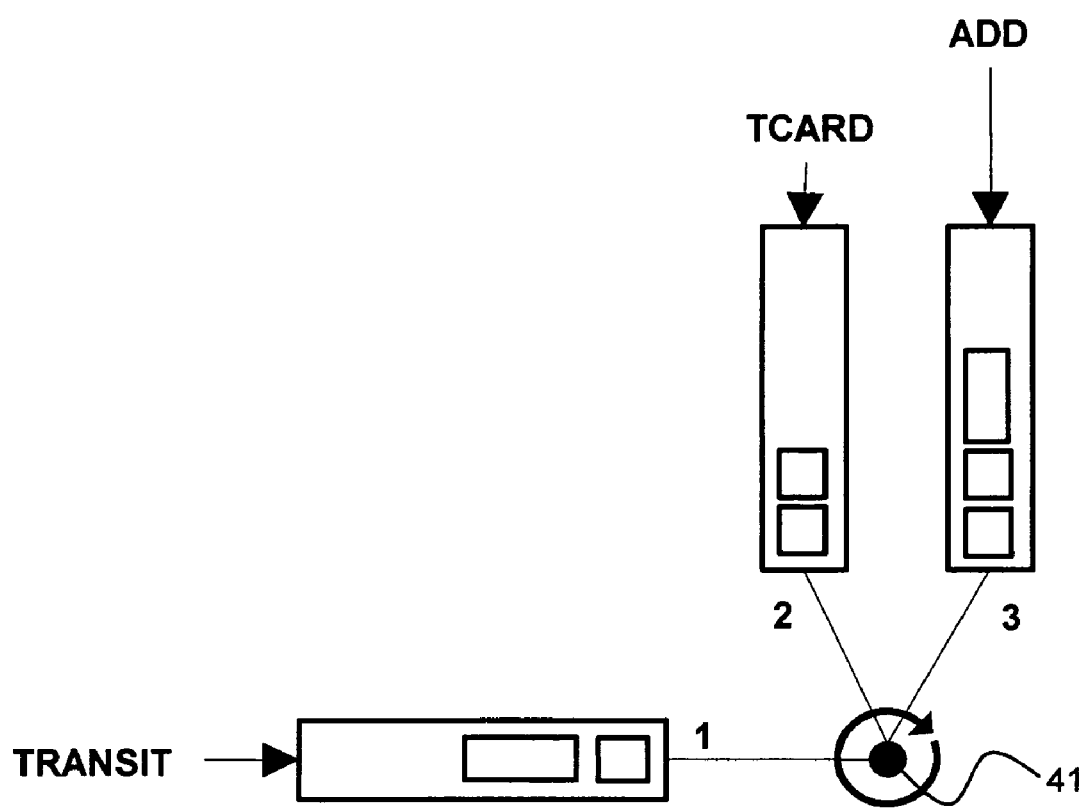
FIG. 4 shows a quality of service (QoS) model for use with the invention, taking into account the origin of data only.
Figure 5:
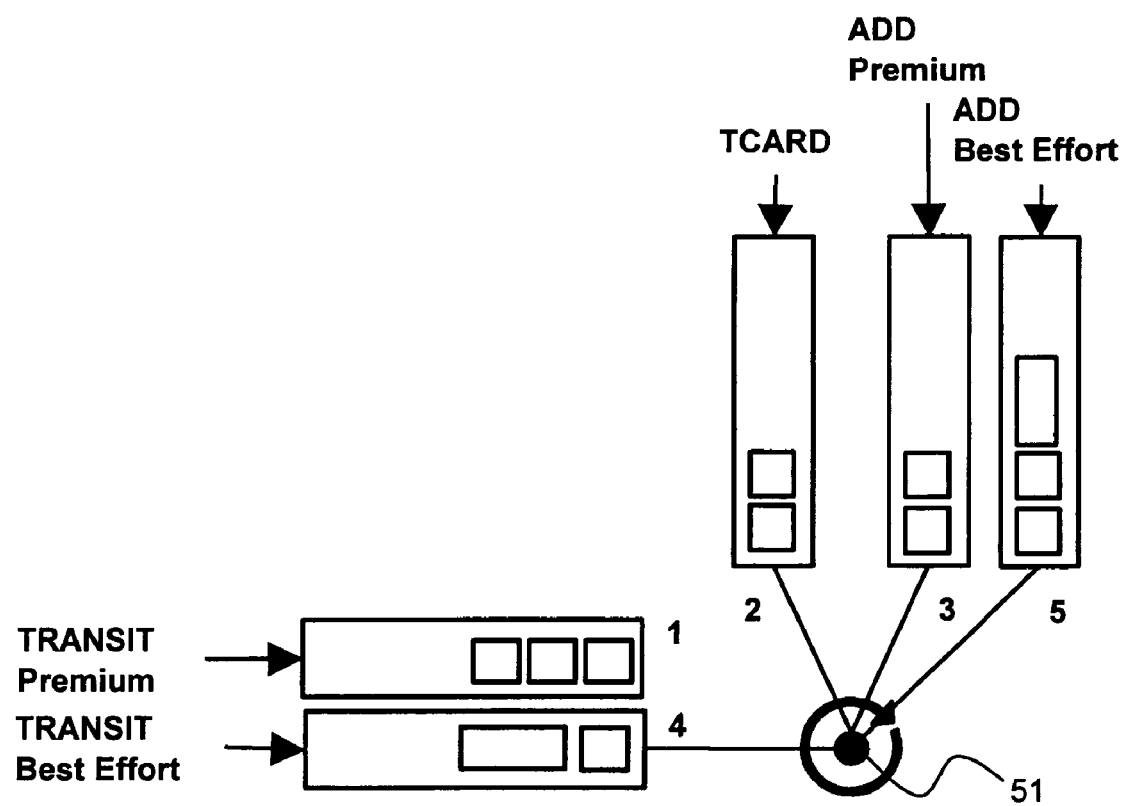
FIG. 5 shows another QoS model for use with the invention, taking into account the origin of data and priority levels of data of all origins of data.
Figure 6:
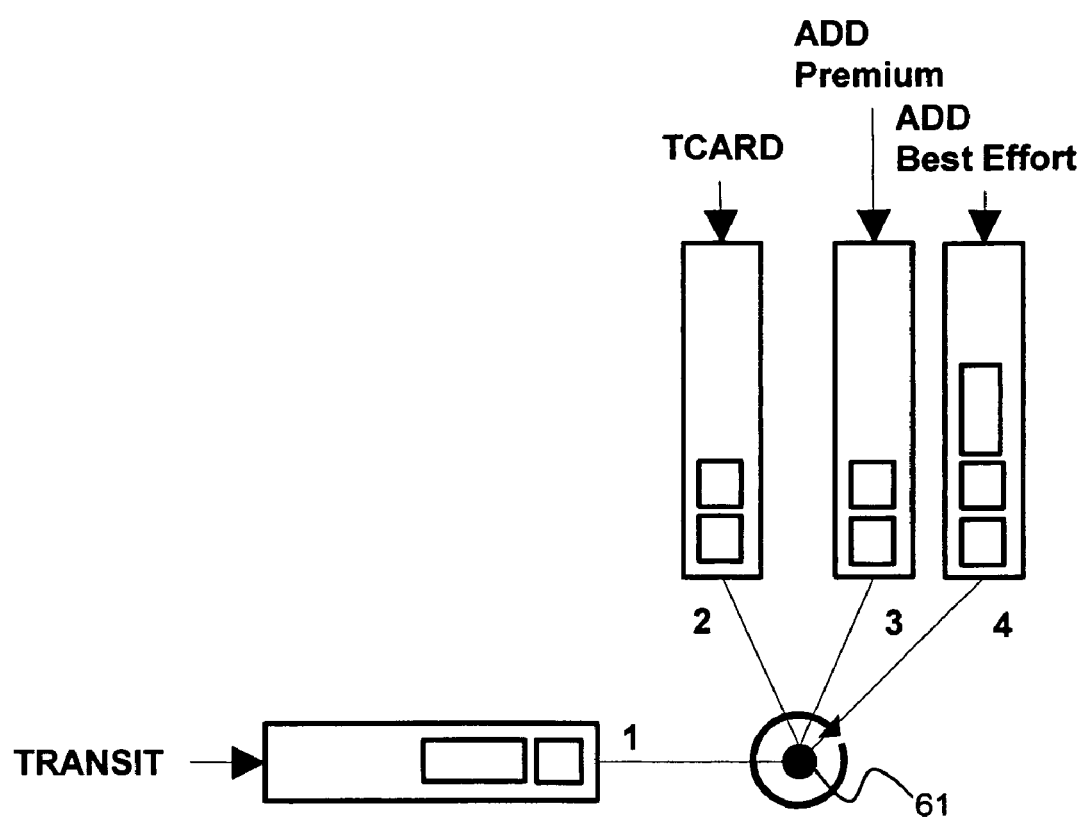
FIG. 6 shows another QoS model for use with the invention, taking into account the origin of data and priority levels of data originating from the local node (=add traffic).

Following FIGS. 4 to 6 illustrate how a node sends traffic downstream on the bus, in accordance with the invention. Let us consider node B of FIG. 3 once more. Node B receives traffic via the data bus 32 from node A to be sent downstream;

this traffic is called transit traffic. Further, node B adds traffic b to data bus 32. Finally, node B also has to insert free data transfer capacity on to the data bus 32 as represented by TCARD 2.

FIG. 4 shows a quality of service model how to allocate these three sources of traffic at a node to the downstream data bus. The node comprises a round robin scheduler 41 which can allocate traffic to the downstream section of a data bus. In a simple case, where neither transit traffic nor add traffic are distinguished by priority levels, all in all three traffic sources have to be considered. In the example of FIG. 4, a priority order of first transit traffic, second TCARD, and third add traffic is proposed, in accordance with the invention.

In FIG. 5 a quality of service model distinguishing between premium and best effort traffic, both in the transit traffic and in the add traffic at a node is considered. The round robin scheduler 51 gives the highest priority to transit premium traffic, the second priority to TCARD, the third priority to add premium traffic, the fourth priority to transit best effort traffic, and the lowest fifth priority to add best effort traffic. By these means, the average delay time of premium traffic, both in transit and from other nodes, is minimized. However, best effort traffic may have to wait at every node on a bus when premium traffic is plentiful.

In FIG. 6 only the add traffic is distinguished by priority levels premium and best effort. The round robin scheduler 61 gives the highest priority to transit traffic, the second priority to TCARD, the third priority to add premium traffic, and the lowest and fourth priority to add best effort traffic. This quality of service model still gives low average delay times for premium traffic, but at the same time avoids the accumulation of delay times for best effort traffic. This model gives best effort and premium traffic in transit an equal priority, so best effort traffic added at a node only has to wait at the node where it is added. It will not need to wait at further downstream nodes.

Of course, in accordance with the invention, more priority levels than premium and best effort can be applied and more complex priority level distributions can be handled by a service level agreement protocol. It is further worth mentioning that a network in accordance with the invention does not need to comprise only one bus, but may include more complex bus systems, in particular with buses of opposite directions of data flow. However, to each bus the inventive method with the fairness mechanism is applied separately.

The invention claimed is:

1. A method for operating a packet based data network, the data network comprising a multitude of nodes and a shared data bus,
   wherein at least some of the nodes add traffic to the data bus, and
   wherein with respect to a data flow in one direction of the data bus, the upstream nodes reserve data transfer capacity of the data bus for downstream nodes by means of a fairness mechanism that applies anti-tokens at the nodes which add traffic to the data bus,
   wherein at least some of the nodes drop traffic from the data bus,
   said fairness mechanism takes into account the traffic to be dropped at downstream nodes,
   wherein traffic to be added at a node is split into logical paths where each logical path corresponds to a destination node of the added traffic, the fairness mechanism being applied to each logical path to determine the data transfer capacity available at a node for the respective logical paths, where the data bus is a single communication channel connected to each node that carries all traffic on all of the logical paths,
   wherein the anti-tokens forbid a node to emit data traffic for a given amount of time, thus preserving traffic voids for nodes located downstream to define reserved data capacity based on data transfer capacity available for the logical paths.

2. A method according to claim 1, wherein reserved data capacity at a node i is $R_i$ where $R_i = A_{i+1} - D_{i+1} + R_{i+1}$ for at least some of the nodes, with i being a node index number, wherein the index numbers increase in downstream direction of the data traffic; $A_{i+1}$ being added traffic at node i+1, wherein node i+1 is the neighbouring node of node i on the data bus in downstream direction; $D_{i+1}$ being dropped traffic at node i+1; and $R_{i+1}$ being reserved data capacity at node i+1.

3. A method according to claim 1, wherein a terminal node at the downstream end of the data bus, wherein data traffic is only dropped at the terminal node, and no data traffic is added at the terminal node.

4. A method according to claim 1, wherein the fairness mechanism generates anti-tokens for each of the logical paths.

5. A method according to claim 1, wherein in at least some of the nodes, transit traffic received from the data bus by a node is passed through the node and add traffic received by the node from another source is added to the data bus, wherein the add traffic comprises at least two priority levels, and that the fairness mechanism takes into account the traffic is transit or add traffic, as well as the priority level of the traffic.

6. A method according to claim 5, wherein the node has a priority order of
   I) transit premium traffic
   II) reserved data capacity for downstream nodes
   III) add premium traffic
   IV) transit best effort traffic V) add best effort traffic,
   or a priority order of
   I) transit traffic
   II) reserved data capacity for downstream nodes
   III) add premium traffic
   IV) add best effort traffic,
   wherein I) indicates highest priority.

7. A method according to claim 1, wherein the add traffic at a node is split into logical paths according to the destination of the add traffic, and that a fairness mechanism is applied to each logical path to determine the data transfer capacity available for the respective logical path.

8. A method according to claim 7, wherein add traffic of a logical path of a first node with a destination not farther than a second node located anywhere downstream of the first node is added to the data bus independently from both the add traffic at the second node and the data capacity to be reserved downstream of the second node.

9. A node for adding traffic to a shared data bus of a packet based data network the node comprising:
   means for taking into account the traffic to be dropped at downstream nodes with respect to a data flow in one direction of the data bus where the data bus is a single communication channel that carries all traffic on the data bus,
   means for splitting add traffic into logical paths where each logical path corresponds to a destination node of the add traffic to be carried by the data bus, and
   means for applying a fairness mechanism to each logical path to determine a data transfer capacity available for the respective path, wherein the fairness mechanism applies anti-tokens at the node, and wherein the anti-tokens forbid the node to emit data traffic for a given amount of time.

10. A data network management system for operating a packet based data network having a multitude of nodes and a shared data bus, wherein at least some of the nodes add traffic to and drop traffic from the data bus, wherein with respect to a data flow in one direction of the data bus, the upstream nodes reserve data transfer capacity of the data bus for downstream nodes, the data network management system comprising:

a fairness mechanism that applies anti-tokens at the nodes which add traffic to the data bus where the data bus is a single communication channel that carries all traffic among the nodes, said fairness mechanism taking into account the traffic to be dropped at downstream nodes, means for splitting the traffic to be added at a node into logical paths where each logical path corresponds to a destination node of the added traffic, the fairness mechanism being applied to each logical path to determine the data transfer capacity available for the respective logical path, wherein the anti-tokens forbid a node to emit data traffic for a given amount of time, thus preserving traffic voids for nodes located downstream based on data transfer capacity available for the logical paths.

* * * * *

UNITED STATES PATENT AND TRADEMARK OFFICE
CERTIFICATE OF CORRECTION

PATENT NO. : 7,590,753 B2
APPLICATION NO. : 11/405636
DATED : September 15, 2009
INVENTOR(S) : Wolde et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 651 days.

Signed and Sealed this

Twenty-first Day of September, 2010

David J. Kappos
*Director of the United States Patent and Trademark Office*